US011932271B2

(12) United States Patent
Ariannezhad et al.

(10) Patent No.: US 11,932,271 B2
(45) Date of Patent: Mar. 19, 2024

(54) DRIVE ASSIST OPTIMIZATION SYSTEMS AND METHODS USING ARTIFICIAL INTELLIGENCE

(71) Applicant: Ford Global Technologies, LLC, Dearborn, MI (US)

(72) Inventors: Amin Ariannezhad, Troy, MI (US); Navid Tafaghodi Khajavi, Troy, MI (US); Mohsen Bahrami, Birmingham, MI (US); Mohammad Nekoui, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 17/168,346

(22) Filed: Feb. 5, 2021

(65) Prior Publication Data

US 2022/0250639 A1 Aug. 11, 2022

(51) Int. Cl.
*B60W 50/14* (2020.01)
*B60W 30/14* (2006.01)
(Continued)

(52) U.S. Cl.
CPC ............ *B60W 50/14* (2013.01); *B60W 30/14* (2013.01); *B60W 40/04* (2013.01); *B60W 40/06* (2013.01); *B60W 40/09* (2013.01); *B60W 2554/4046* (2020.02); *B60W 2556/10* (2020.02); *B60W 2556/45* (2020.02)

(58) Field of Classification Search
CPC ... B60W 2050/0031; B60W 2050/143; B60W 2520/105; B60W 2540/229; B60W 2540/30; B60W 2552/05; B60W 2552/30; B60W 2554/4046; B60W 2556/10; B60W 2556/20; B60W 2556/50; B60W 2556/45; B60W 30/14; B60W 30/182; B60W 40/04; B60W 40/06; B60W 40/09; B60W 50/14
See application file for complete search history.

(56) References Cited

U.S. PATENT DOCUMENTS 9,940,834 B1 4/2018 Konrardy et al.
10,324,463 B1* 6/2019 Konrardy ............. G05D 1/0278
(Continued)

OTHER PUBLICATIONS

Marthinus Meiring et al. "A Review of Intelligent Driving Style Analysis Systems and Related Artificial Intelligence Algorithms" (Dec. 2015).

*Primary Examiner* — Jeff A Burke
*Assistant Examiner* — Zachary Joseph Wallace
(74) *Attorney, Agent, or Firm* — Brandon Hicks; Eversheds Sutherland (US) LLP

(57) ABSTRACT

Systems and methods for predicting an optimal use level of a driver assist system are provided. The system may collect historical driver behavior and road condition data, and train an optimization prediction model using the historical data, e.g., via machine learning or artificial intelligence. Moreover, the system may collect real-time driver behavior and road condition data, and predict an optimal use level of the driver assist system based on the real-time data using the trained optimization prediction model. The system may then send feedback to the driver assist system when the optimal use level falls outside a predetermined threshold, such that the driver assist system may be unavailable or have reduced functionality until the optimal use level improves.

14 Claims, 4 Drawing Sheets

(51) Int. Cl.
  *B60W 40/04*   (2006.01)
  *B60W 40/06*   (2012.01)
  *B60W 40/09*   (2012.01)

(56) References Cited

U.S. PATENT DOCUMENTS

| | | |
|---|---|---|
| 2014/0257659 A1 | 9/2014 | Dariush |
| 2018/0274927 A1 | 9/2018 | Epperlein et al. |
| 2019/0184998 A1* | 6/2019 | Zheng .................. B60W 40/09 |
| 2019/0389381 A1 | 12/2019 | Pedersen |
| 2020/0356100 A1* | 11/2020 | Nagarajan .......... G01C 21/3602 |
| 2022/0048524 A1* | 2/2022 | Kawanai ................ G08G 1/161 |
| 2022/0063639 A1* | 3/2022 | Stenneth ........... B60W 60/0051 |

* cited by examiner

DRIVE ASSIST OPTIMIZATION SYSTEMS AND METHODS USING ARTIFICIAL INTELLIGENCE

BACKGROUND

Recent efforts in the automotive industry have led to development of different levels (e.g., autonomy level 1 to 5) of driving automation. For example, driver assistance, partial automation, conditional automation, high automation, and full automation are different levels of driving automation. Except the full automation level, drivers in other levels are required to contribute to driving. The most common levels in current production vehicles are mostly Driver Assistance (DA) and partial automation. Although DA provides many benefits, there may be instances when using DA is not ideal.

It is with respect to these and other considerations that the disclosure made herein is presented.

DETAILED DESCRIPTION

Overview

Figure 1:
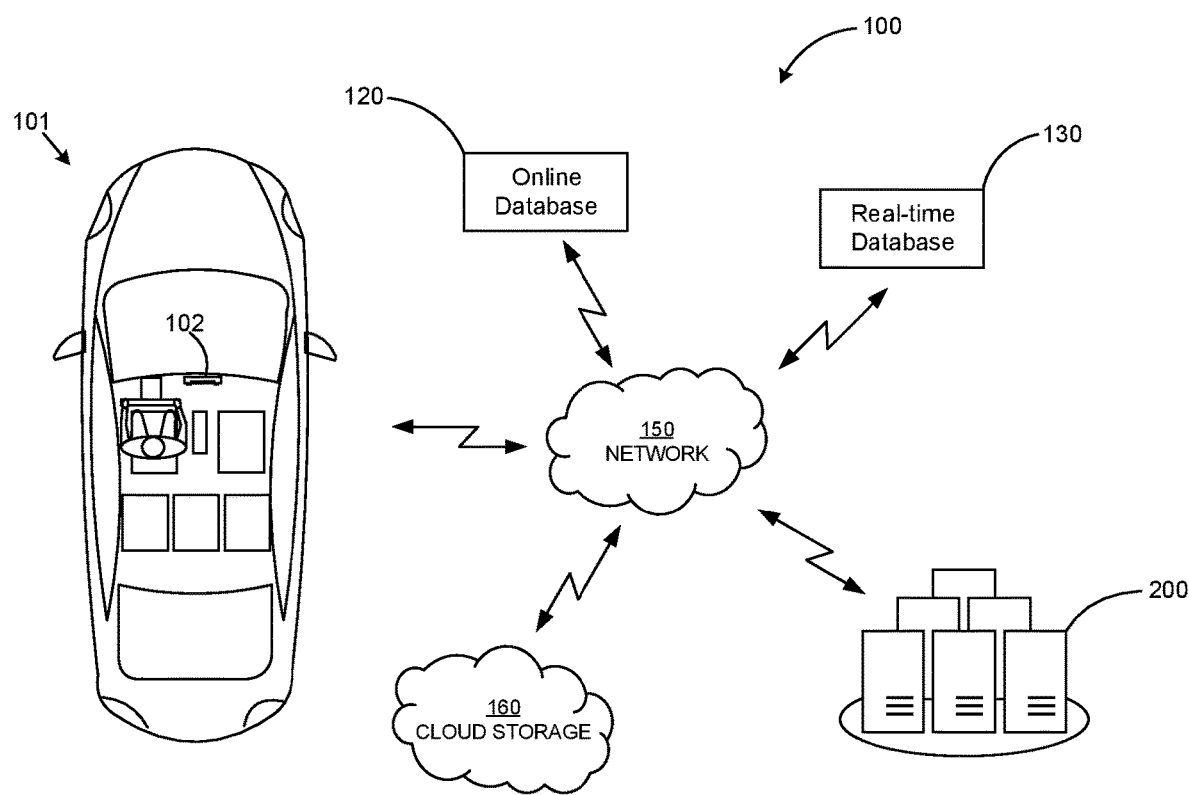
FIG. 1 illustrates a system for predicting an optimal use level of a driver assist system in accordance with the principles of the present disclosure.

Disclosed is a real-time vehicle system and method that may be used to calculate a level of optimal use associated with using any type of driving assist system in certain instances and scenarios. The driving assistant system may be disabled when the optimal use level is determined to be outside a predetermined threshold. For example, the system may divide roadways to different segments (e.g. every 0.5-1 mile or where the road type changes). Historical data may be collected, separately for every road segment, to develop an optimization prediction system. This data may include, for example, drivers' behavior data, traffic data (average speed and number of vehicles on the road, from V2X), weather data, crash data, roadway geometry data, surface condition, etc. An optimization prediction model may then be trained using the historical data. This model may be capable of utilizing all data sources to accurately predict the optimal use for using drive assist systems for each driver, on all road segments. Optimization prediction may then be performed using the using real-time data (driving behavior, traffic from V2X, weather, roadway geometry, surface condition, etc.) into the trained model. Feedback from the model may be provided to the driver assist system. When the optimal use associated with using the system is determined to be below a threshold for the driver, the system may be unavailable to the driver until the optimal use improves. If the driver is already using the system, it may be disabled. In either case, the driver is notified that the system is unavailable due to its optimal use level falling outside a predetermined threshold.

The driver behavior data and traffic data (e.g. average speed, number of vehicles, frequency of lane changing, etc.) may be frequently collected through the V2X system from vehicles on the road. The optimal use value associated with the driver assist system may then be predicted for the drivers. The optimal use value is sent back to the vehicle and if it falls outside a threshold, the driver assist system will be disabled. If the driver wants to start using the driver assist system or is already using it, a message is shown on the vehicle's interface to inform the driver that the driver assist system is temporary unavailable due to the decreased optimal use level. The optimal use is calculated and updated in real-time such that the driver assist system will be available as soon as the optimal use improves. In some instances, the threshold may be predetermined and/or determined in real-time.

The real-time systems and methods disclosed herein calculate the optimal use associated with using any type of driving assistant system, and disable the system when the optimal use is below a threshold, which will optimize the driver's use of the driver assist system. This will eventually result in mitigating accidents, smoothing the traffic, enhancing roads safety, and improving roadways mobility.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, driver assist optimization prediction system 100 is described. System 100 may include vehicle 101 having control module 102 operatively coupled to a GPS system and to a Driver Assistance (DA) system, e.g., a driver assist system, of vehicle 101, online database 120, and real-time database 130, all communicatively coupled to driver assist optimization prediction platform 200 via, e.g., network 150. Driver assist optimization prediction platform 200 may be located on one or more servers, e.g., stored on cloud 160 or on control module 102.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, driver assist optimization prediction platform 200 may be configured and/or programmed to operate with a vehicle having a Level-1, Level-2, Level-3, Level-4, or Level-5 autonomous vehicle controller.

Control module 102 of vehicle 101 may store driver behavior data, e.g., data indicative of how a particular driver of vehicle 101 drives under specific road conditions. For example, a driver may tend to decelerate abruptly when another vehicle changes lane in front of vehicle 101, and/or the driver may tend to switch lanes abruptly when there are many other vehicles on the road segment, and/or the driver may drive slower when it is raining, when the road is curvy, and/or when the road surface is slippery. Accordingly, control module 102 may be customized for individual drivers of vehicle 101. In addition, control module 102 may communicate with the GPS system of vehicle 101 such that control module 102 may communicate location data of vehicle 101 to driver assist optimization prediction platform 200.

Online database 120 may be any online database providing historical road condition data for a given road segment as described in further detail below. For example, the historical road condition data may include historical traffic data, historical weather data, historical accident data, historical surface condition data and/or historical road geometry data. Traffic data may include data indicative of, e.g., average vehicle speed, number of vehicles, frequency of lane changing, and interactions between vehicles for a given road segment. Moreover, road geometry data may include data indicative of, e.g., type of road, road shape, number of lanes, and lane width of a given road segment.

Real-time database 130 may be any online database providing real-time road condition data for a given road segment, e.g., the road segment vehicle 101 is approaching and/or driving on. For example, the real-time road condition data may include real-time traffic data, real-time weather data, real-time accident data, real-time surface condition data and/or real-time road geometry data.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, and/or visible light communications.

Some or all portions of the wireless communication link that supports communications between driver assist optimization prediction platform 200 and a communication device, such as a router, for example, that may be included in network 150, may be implemented using various types of wireless technologies, such as Bluetooth®, ZigBee®, or near-field-communications (NFC), cellular, Wi-Fi, Wi-Fi direct, machine-to-machine communication, man-to-machine communication, and/or a vehicle-to-everything (V2X) communication.

Information shared between driver assist optimization prediction platform 200, control module 102, online database 120, and real-time database 130 may be stored on cloud storage 160 and may be bi-directional in nature. For example, in one case, driver assist optimization prediction information, e.g., historical driver behavior and road condition data may be transferred from driver assist optimization prediction platform 200 to cloud storage 160. Such information stored on cloud storage 160 may be accessed and used by control module 102, e.g., various smart vehicles.

Figure 2:
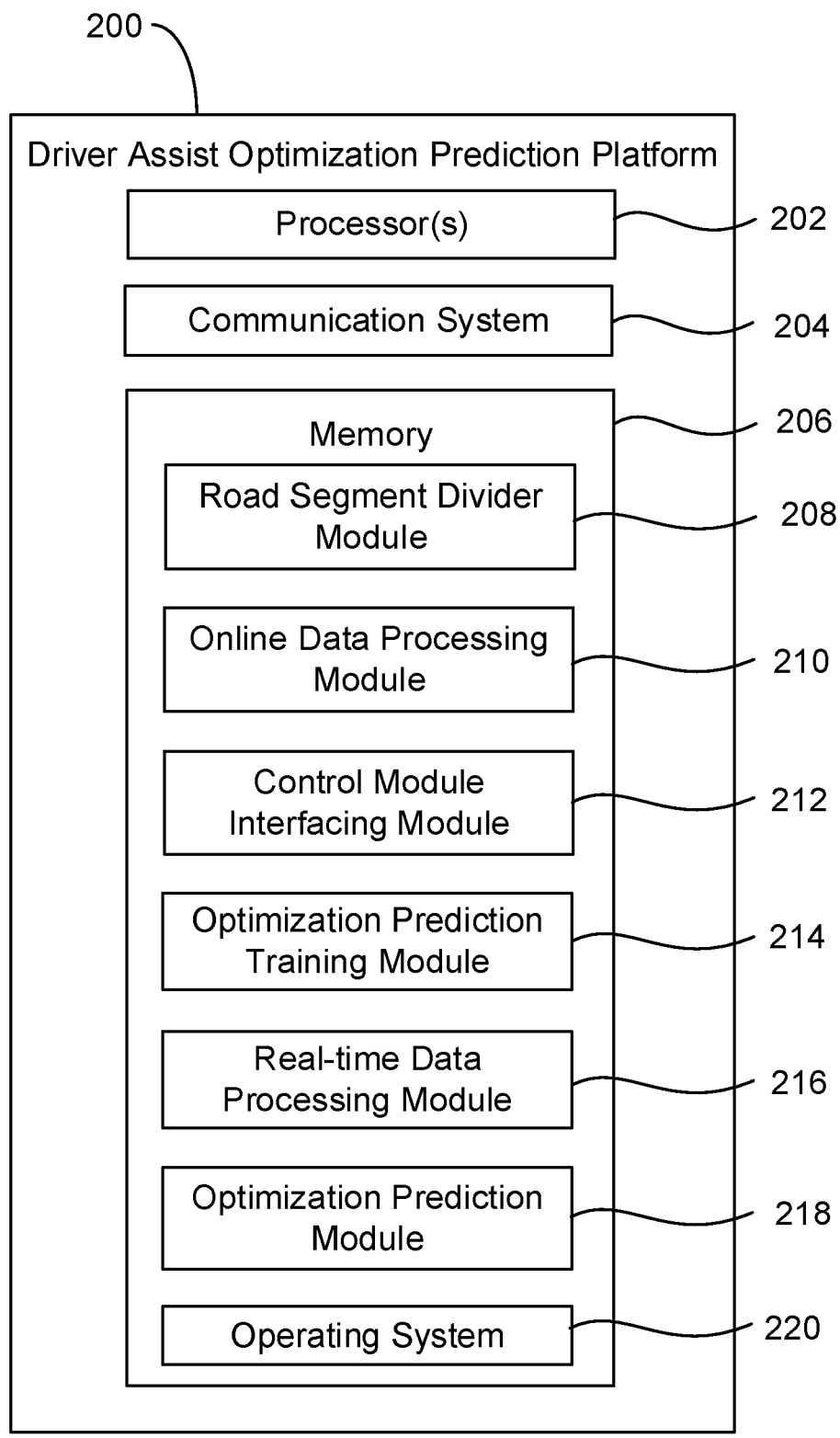
FIG. 2 shows some example components that may be included in a driver assist optimization prediction platform in accordance with the principles of the present disclosure.

Referring now to FIG. 2, components that may be included in driver assist optimization prediction platform 200 are described in further detail. Driver assist optimization prediction platform 200 may include one or more processors 202, communication system 204, and memory 206. Communication system 204 may include a wireless transceiver that allows driver assist optimization prediction platform 200 to communicate with control module 102 of vehicle 101, online database 120, real-time database 130, and cloud storage 160. The wireless transceiver may use any of various communication formats, such as, for example, an Internet communications format, or a cellular communications format.

Memory 206, which is one example of a non-transitory computer-readable medium, may be used to store operating system (OS) 220, road segment divider module 208, online data processing module 210, control module interfacing module 212, optimization prediction training module 214, real-time data processing module 216, and optimization prediction module 218. The modules are provided in the form of computer-executable instructions that may be executed by processor 202 for performing various operations in accordance with the disclosure.

Road segment divider module 208 may be executed by processor 202 for dividing a road segment, e.g., roadway, into a plurality of road segments, such that historical driver behavior and road condition data may be collected for each road segment of the plurality of road segments. For example, the roadway may be divided into road segments based on length, e.g., every 0.5 to 1 mile. Alternatively, the roadway may be divided based on where the road type of the road segment changes, e.g., a first straight portion of a roadway may be a first road segment, a curved portion of the roadway may be a second road segment, and a second straight portion of the roadway may be a third road segment. Moreover, a portion of the roadway having two lanes may be one road segment, whereas a portion of the roadway having three lanes may be another road segment.

Online data processing module 210 may be executed by processor 202 for communicating with online database 120. Accordingly, online data processing module 210 may receive and process historical road condition data from online database 120.

Control module interfacing module 212 may be executed by processor 202 for communicating with control module 102 of vehicle 101. For example, control module interfacing module 212 may receive location data of vehicle 101 via a GPS system operatively coupled to control module 102 to determine the geographical location of vehicle 101. Moreover, control module interfacing module 212 may receive historical and real-time driver behavior data from control module 102, e.g., for an individual driver of vehicle 101. In addition, control module interfacing module 212 may transmit an alert to the driver assist system of vehicle 101 via control module 102 as described in further detail below, such that the driver assist system may take the appropriate optimization action.

Optimization prediction training module 214 may be executed by processor 202 for training an optimization prediction model, e.g., via machine learning or artificial intelligence, based on the historical driver behavior and road condition data for a given road segment. Accordingly, the optimal use of using a driver assist system such as adaptive cruise control may be calculated based on previous instances of decreased optimal use of a driver. Thus, the optimization prediction model described herein may be trained via optimization prediction training module 214 to discover the patterns and relationships in the historical data; more specifically, to identify those types of driver behaviors and road conditions (e.g. traffic data, roadway type and geometric conditions, weather conditions, surface condition, etc.) that will likely lead to, e.g., decreased optimal use. Copied below is a general function of the optimization:

$$\text{Optimization}_{driver\ i} = f(x_1, x_2, \ldots, x_n)$$

In this function, given all the conditions on the road and driver's behavior, $\text{Optimization}_{driver\ i}$ is the probability that the driver i will have to decelerate severely, to turn off the driver assist system and control the vehicle manually.

$x_1$ to $x_n$ are all the variables including the driver's behaviors (history of driving in the past and real-time behavior), traffic flow characteristics (e.g. average speed, number of vehicles, frequency of lane changing, interactions between vehicles, etc.), roadway geometric conditions (e.g. type of road, road shape, number of lanes, lane width, etc.), weather and road surface conditions, etc. The driver's past driver behavior may include the driver's acceleration and deceleration patterns and frequency of distraction by the driver in each type of road condition (e.g., number of times the driver violated the lanes by tracking their lane keeping system record).

Real-time data processing module 216 may be executed by processor 202 for communicating with real-time database 130. Accordingly, real-time data processing module 216 may receive and process real-time road condition data from real-time database 130.

Optimization prediction module 218 may be executed by processor 202 for predicting an optimal use level of a driver assist system using the optimization prediction model and real-time driver behavior and road condition data. Accordingly, in the future, when similar driving behaviors and road conditions occur on a road segment, optimization prediction module 218 may input the real-time driver behavior and road condition data into the optimization prediction model to predict the associated optimal use for the driver using the driver assist system.

Figure 3:
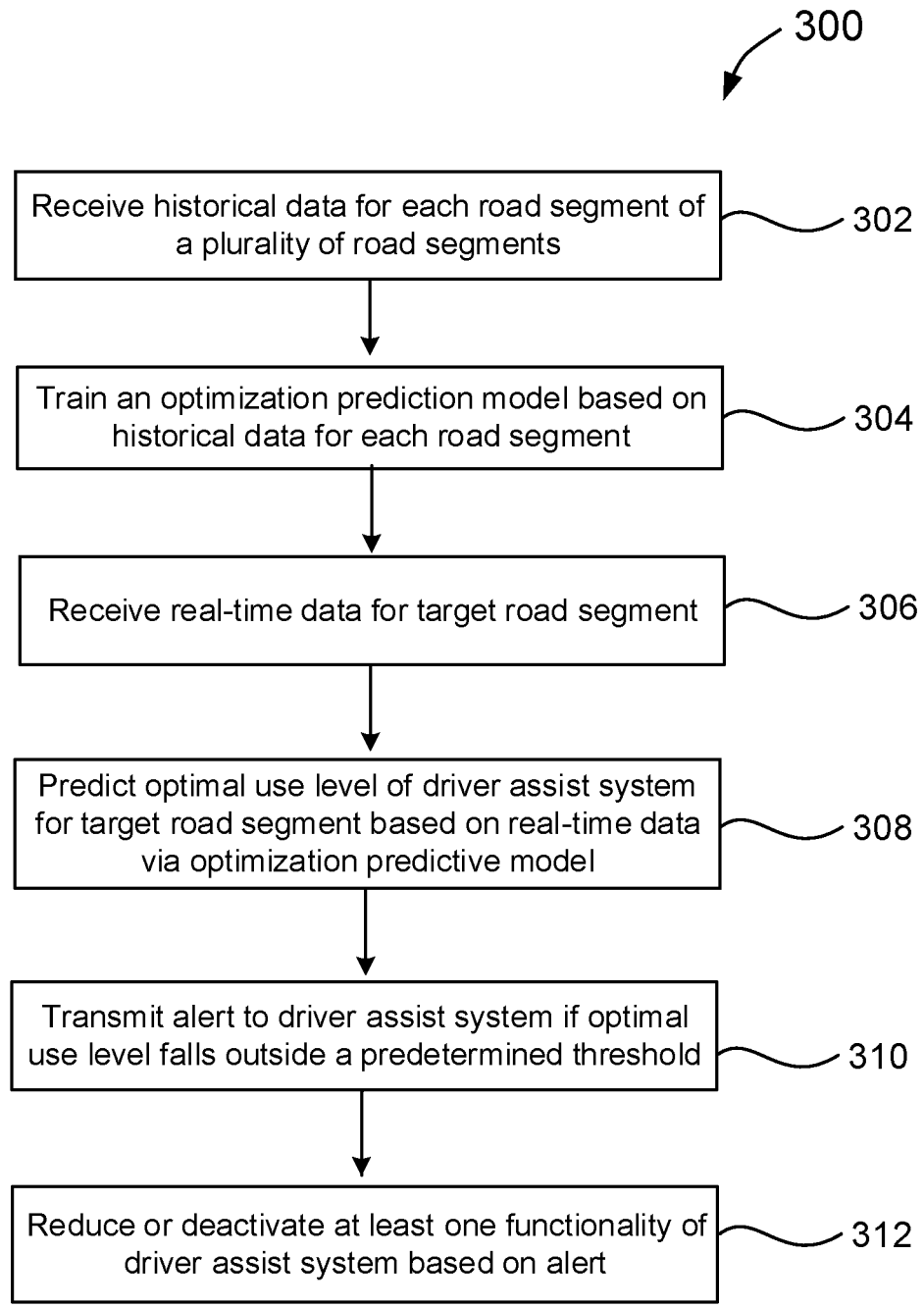
FIG. 3 is a flow chart illustrating exemplary steps for predicting an optimal use level of a driver assist system in accordance with the principles of the present disclosure.

Referring now to FIG. 3, exemplary method 300 for predicting an optimal use level of a driver assist system is described. At step 302, driver assist optimization prediction platform 200 may receive historical data for each road segment of a roadway, e.g., as divided by road segment divider module 208. For example, online data processing module 210 may receive historical road condition data from online database 120, and control module interfacing module 212 may receive historical driver behavior data from control module 102 for an individual driver for a given road segment.

At step 304, optimization prediction training module 214 may train an optimization prediction model, e.g., via machine learning or artificial intelligence, based on the historical driver behavior and road condition data for each road segment. At step 306, driver assist optimization prediction platform 200 may receive real-time data for a target road segment, e.g., the road segment that vehicle 101 is approaching or driving on. For example, real-time data processing module 216 may receive real-time road condition data from real-time database 130, and control module interfacing module 212 may receive real-time driver behavior data from control module 102, e.g., the identity of the driver of vehicle 101.

At step 308, optimization prediction module 218 may predict an optimal use level of the driver assist system for the target road segment by inputting the real-time driver behavior and road condition data into the trained optimization prediction model. The predicted optimal use level may be compared with a predetermined threshold for the driver assist system stored in a database, e.g., in memory 206 or cloud 160, to determine whether the predicted optimal use level falls outside the predetermined threshold. If the predicted optimal use level falls outside the predetermined threshold, at step 310, control module interfacing module 212 may transmit an alert to the driver assist system via control module 102. Accordingly, at step 312, the driver assist system may reduce or deactivate at least one functionality of the driver assist system based on the alert.

Figure 4:
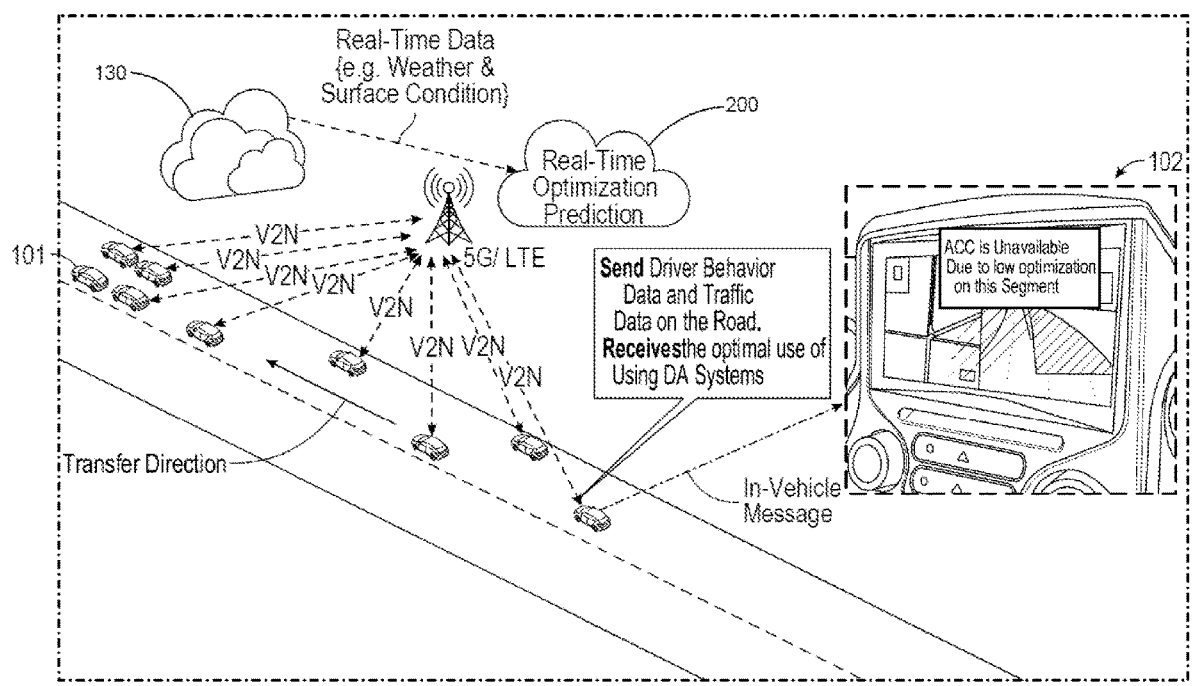
FIG. 4 illustrates an exemplary application of the system of FIG. 1 in accordance with the principles of the present disclosure.

Referring now to FIG. 4, an exemplary application of system 100 is provided. As shown in FIG. 4, driver behavior data and traffic data (e.g. average speed, number of vehicles, frequency of lane changing, etc.) may be frequently collected through the V2X communication system from multiple vehicles on the road, whether they use a driver assist system or not. The optimal use level value associated with the driver assist system may then be predicted for the drivers. The optimal use value may then be sent back to the vehicle and if it is determined to fall outside a predetermined threshold, the driver assist system will be disabled, or at least partially reduced in functionality. If the driver wants to start using the driver assist system or is already using it, a message may be displayed on a graphical user interface of control module 102, e.g., SYNC, to inform the driver that the driver assist system is temporary unavailable due to the optimal use level falling outside a predetermined threshold, as shown in FIG. 4. The optimal use level of the driver assist system may be calculated and updated in real-time such that the system may be available as soon as the optimal use level improves. As will be understood by a person having ordinary skill in the art, the optimization prediction model may be tuned for each automation level system (driver assist system, partial automation, conditional automation, etc.) separately.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for predicting an optimal use level of a driver assist system, the system comprising:
 a transceiver configured to receive historical data for each road segment of a plurality of road segments and real-time data for a target road segment;
 a memory that stores computer-executable instructions; and
 a processor configured to access the memory and execute the computer-executable instructions to:
  train, using machine learning techniques, an optimization prediction model based on the historical data for each road segment of the plurality of road segments, wherein the historical data comprises historical road condition data including roadway type data and geometric roadway data, and historical driver behavior data associated with a user of the driver assist system the historical behavior data including data corresponding to tendencies of the user to switch lanes abruptly, and tendencies of the user to drive slow in rain conditions, slippery road conditions, and along sharp curves;
  predict the optimal use level of the driver assist system for the target road segment based on the real-time data via the optimization prediction model;
  transmit an alert to the driver assist system if the optimal use level falls outside a predetermined threshold, thereby deactivating a cruise control functionality of the driver assist system; and
  reactivate the cruise control functionality responsive to the optimal use level falling back inside the predetermined threshold,
  wherein the optimization prediction model includes a probability that a driver of a vehicle comprising the driver assist system will turn off the driver assist system and manually control the vehicle, wherein the probability is based on real-time driver behavior as well as past driver behavior, wherein the past driver behavior includes acceleration and deceleration patterns of the driver and frequency of distraction by the driver in each of a number of road conditions, and wherein the frequency of distraction comprises a number of times the driver violated lanes based on a lane keeping system record.

2. The system of claim 1, wherein the historical road condition data further comprises historical traffic data, historical weather data, historical accident data, and historical surface condition data, and wherein the real-time road condition data comprises real-time traffic data, real-time weather data, real-time accident data, real-time surface condition data and real-time road geometry data.

3. The system of claim 2, wherein the historical and real-time traffic data comprise data indicative of average vehicle speed, number of vehicles, frequency of lane changing, and interactions between vehicles for each road segment of the plurality of road segments and the target road segment, respectively.

4. The system of claim 2, wherein the transceiver is configured to receive data indicative of historical and real-time traffic data via V2X communication.

5. The system of claim 2, wherein the historical and real-time road geometry data comprise type of road, road shape, number of lanes, and lane width for each road segment of the plurality of road segments and the target road segment, respectively.

6. The system of claim 1, wherein the plurality of road segments are divided into each road segment based on a predetermined distance.

7. The system of claim 6, wherein the predetermined distance is 0.5 to 1 mile.

8. The system of claim 1, wherein the plurality of road segments are divided into each road segment based on changes from curved road segments to straight road segments between each road segment of the plurality of road segments.

9. The system of claim 1, wherein the processor is configured to predict the optimal use level of the driver assist system for the target road segment based on the real-time data via the optimization prediction model by comparing the real-time data for the target road segment with the historical data for each road segment of the plurality of road segments.

10. The system of claim 9, wherein the optimization prediction model is configured to predict the optimal use level of the driver assist system for the target road segment based on the road segment of the plurality of road segments having historical data comprising at least a predetermined similarity to the real-time data of the target road segment.

11. A method for predicting an optimal use level of a driver assist system, the method comprising:
 receiving historical data for each road segment of a plurality of road segments;
 training, using machine learning techniques, an optimization prediction model based on the historical data for each road segment of the plurality of road segments, wherein the historical data comprises historical road condition data including roadway type data and geometric roadway data, and historical driver behavior data associated with a user of the driver assist system, the historical driver behavior data including data corresponding to tendencies of the user to switch lanes abruptly, and tendencies of the user to drive slow in rain conditions, slippery road conditions, and along sharp curves;
 receiving real-time data for a target road segment;
 predicting the optimal use level of the driver assist system for the target road segment based on the real-time data via the optimization prediction model;
 transmitting an alert to the driver assist system if the optimal use level falls outside a predetermined threshold, thereby deactivating a cruise control functionality of the driver assist system; and
 reactivating the cruise control functionality responsive to the optimal use level falling back inside the predetermined threshold,
 wherein the optimization prediction model includes a probability that a driver of a vehicle comprising the driver assist system will turn off the driver assist system and manually control the vehicle, wherein the probability is based on real-time driver behavior as well as past driver behavior, wherein the past driver behavior includes acceleration and deceleration patterns of the driver and frequency of distraction by the driver in each of a number of road conditions, and wherein the frequency of distraction comprises a number of times the driver violated lanes based on a lane keeping system record.

12. The method of claim 11, wherein predicting the optimal use level comprises comparing the real-time data for the target road segment with the historical data for each road segment of the plurality of road segments.

13. The method of claim 12, wherein predicting the optimal use level comprises predicting the optimal use level based on the road segment of the plurality of road segments having historical data comprising at least a predetermined similarity to the real-time data of the target road segment.

14. The method of claim 11, wherein the historical data comprises historical driver behavior data, historical traffic data, historical weather data, historical accident data, historical surface condition data, and historical road geometry data, and wherein the real-time data comprises real-time driver behavior data, real-time traffic data, real-time weather data, real-time accident data, real-time surface condition data, and real-time road geometry data, wherein the historical and real-time traffic data comprise data indicative of average vehicle speed, number of vehicles, frequency of lane changing, and interactions between vehicles for each road segment of the plurality of road segments and the target road segment, respectively, and wherein the historical and real-time road geometry data comprise type of road, road shape, number of lanes, and lane width for each road segment of the plurality of road segments and the target road segment, respectively.

* * * * *